United States Patent
Ohkuma et al.

[11] Patent Number: 6,033,337
[45] Date of Patent: Mar. 7, 2000

[54] TORQUE SPLITTING DEVICE WITH AN IMPROVED CURVE TURNING PROPERTY

[75] Inventors: Shinji Ohkuma; Shoji Akaogi, both of Wako, Japan

[73] Assignee: Honda Giken Kogyo Kabushiki Kaisha, Tokyo, Japan

[21] Appl. No.: 08/967,438

[22] Filed: Nov. 11, 1997

[30] Foreign Application Priority Data

Nov. 14, 1996 [JP] Japan ................................. 8-302868

[51] Int. Cl.$^7$ .......................... B62D 11/02; B62D 11/06
[52] U.S. Cl. ................................. 477/1; 475/19
[58] Field of Search ........................... 180/197; 475/86, 475/18, 19, 29; 477/35, 98, 1

[56] References Cited

U.S. PATENT DOCUMENTS

| | | | |
|---|---|---|---|
| 4,926,333 | 5/1990 | Hashiguchi et al. | 180/197 X |
| 4,966,250 | 10/1990 | Imaseki | 475/86 X |
| 5,259,476 | 11/1993 | Matsuno et al. | 180/197 X |
| 5,479,348 | 12/1995 | Sasaki | 180/197 X |
| 5,508,924 | 4/1996 | Yamashita | 180/197 X |
| 5,692,987 | 12/1997 | Shibahata et al. | 475/204 |
| 5,701,247 | 12/1997 | Sasaki | 180/197 X |
| 5,813,939 | 9/1998 | Masumoto et al. | 477/35 |

*Primary Examiner*—Charles A. Marmor
*Assistant Examiner*—Roger Pang
*Attorney, Agent, or Firm*—Skjerven, Morrill, MacPherson, Franklin & Friel LLP; Alan H. MacPherson

[57] ABSTRACT

In a torque splitting device for distributing an input torque applied to an input member to a pair of output members adapted to be coupled with right and left driven wheels of a vehicle at an adjustable distribution ratio, the distribution ratio is determined in such a way that the understeer and oversteer tendencies of the vehicle under a positive or negative drive condition while turning a curve is appropriately controlled. In particular, it is highly desirable to prevent an understeer tendency from appearing while turning a curve. Therefore, when the vehicle is under a positive drive condition while tuning a curve, a yaw moment is produced by an appropriate torque distribution which assists the vehicle to turn in such a way that the understeerg condition is canceled. Furthermore, when the vehicle moves on from a positively drive condition to a negative drive condition while turning a curve, a slight oversteer tendency is produced with a minimum time delay so as to avoid any transient phase of an understeer condition from appearing.

12 Claims, 8 Drawing Sheets

TORQUE SPLITTING DEVICE WITH AN IMPROVED CURVE TURNING PROPERTY

TECHNICAL FIELD

The present invention relates to a torque splitting device for changing the torque distribution ratio to right and left axles depending on the operating condition of the vehicle.

BACKGROUND OF THE INVENTION

The applicant has previously proposed, for instance in Japanese patent laid-open publication No. 8-21492 which corresponds to the U.S. patent application Ser. No. 08/497,557 filed Jun. 30, 1995, a torque splitting device which, provided in parallel with a conventional differential device, controls the simulated rolling resistance to each of the right and left or front and rear axles and boosts the rotational speed of the axle encountering a lower rolling resistance. Thereby, the torque distribution ratio to the right and left axles can be positively changed depending on the steering wheel steering angle and the vehicle speed to the end of improving the steering performance of the vehicle. The contents of the above mentioned United States patent application are hereby incorporated in this application by reference.

As illustrated in FIG. 9, this previously proposed torque splitting device T comprises an oil pressure pump 32 producing an output pressure that depends on the vehicle speed, a regulator Re for adjusting the output pressure to a prescribed level, a pair of wet hydraulic multi-disk clutches Ca and Cd for producing simulated rolling resistances, a pressure regulating valve 30 consisting of a linear solenoid valve for determining a torque distribution ratio for the right and left (or front and rear) wheels according to the turning radius or the road resistance, and controlling the engagement forces of the clutches Ca and Cd so as to achieve a desired torque distribution ratio by adjusting the oil pressure for each of the clutches to a target value, an electronic control unit 29 for computing the target oil pressures, and controlling the electric current for the pressure regulating valve 30, and a planetary gear mechanism P which is connected to the wet hydraulic multi-disk clutches Ca and Cd and actually distributes the torque. The output of the engine E forwarded to the torque splitting device T via the transmission TM can be thus appropriately distributed to the right and left (or front and rear) axles 5L and 5R depending on the operating condition of the vehicle.

Thus, by appropriately distributing the engine drive torque to the right and left driven wheels, it is possible to produce a yaw moment which assist the vehicle to go into a turn while involving a relatively small side slip angle of the front wheels. However, when a front wheel drive vehicle does a relatively tight turn while applying an engine brake to the driven wheels or the front wheels, because the side slip angle of the front wheels increases, a moment is produced which tends to turn the vehicle inward with respect to the turning circle, or an oversteer tendency, is produced as is well known in the art. Conversely, when a front drive vehicle accelerates while turning, the vehicle tends to demonstrate an understeer tendency.

However, when the vehicle is equipped with a torque splitting device, it is possible to eliminate such a tendency by appropriately controlling the torque distribution to the right and left front wheels. This is generally advantageous because most vehicle operators do not particularly prefer the vehicle to show different turning behaviors depending on if the vehicle is accelerating, decelerating, or traveling at constant speed.

However, there are also those vehicle operators who prefer to retain the behavior of the conventional front drive vehicle when turning. In particular, the vehicle operator may rely on the oversteer tendency of the vehicle when going into a tight turn under an engine brake condition or, in some cases, may even deliberately release the accelerator pedal and produce an engine brake condition to force the vehicle to make a sharper turn than otherwise possible.

BRIEF SUMMARY OF THE INVENTION

In view of such problems of the prior art and the recognition by the inventors, a primary object of the present invention is to provide a torque splitting device which allows the vehicle to make a turn exactly as a steering wheel is turned without involving any significant side slip angle of the front wheels.

A second object of the present invention is to provide a torque splitting device which makes the vehicle equipped with the device acceptable to a large majority of vehicle operators.

A third object of the present invention is to provide a torque splitting device which would not create an impression of an understeer tendency when such a tendency is not desirable.

A fourth object of the present invention is to improve the handling of a torque splitting device with a minimum modification.

According to the present invention, these and other objects can be accomplished by providing a torque splitting device for distributing an input torque applied to an input member to a pair of output members adapted to be coupled with right and left driven wheels of a vehicle at an adjustable distribution ratio, comprising: a torque splitting mechanism including at least one hydraulically actuated clutch for controlling a torque distribution ratio to the two output members; an oil circuit for supplying actuating oil to the clutch including a regulating valve for controlling a pressure of the actuating oil supplied to the clutch; means for detecting a drive condition of the vehicle; and a control unit for controlling the torque distribution ratio via the regulating valve according to a prescribed control schedule; the control unit being adapted to change the torque distribution ratio according to an output from the drive condition detecting means when the vehicle is turning. The drive torque detecting means may consist of an actual torque sensor, a throttle opening sensor, or an intake manifold pressure sensor, among other possibilities. The torque distribution ratio may be achieved simply by changing a speed transmission ratio from the input member to at least one of the output members.

According to this arrangement, the understeer and oversteer condition of the vehicle while turning a curve can be controlled at will, and a desired property can be achieved simply by changing the relationship between the vehicle drive condition and the torque distribution ratio. For instance, when the vehicle is turning, the input torque may be more preferentially distributed to one of the output members coupled with an outer wheel of the vehicle over the other output member coupled with an inner wheel of the vehicle when a positive drive condition is detected than when no drive condition is detected. Thus, the understeer condition which is otherwise produced can be appropriately controlled.

Also, when the vehicle is turning, the input torque may be more preferentially distributed to one of the output members coupled with an inner wheel of the vehicle over the other output member coupled with an outer wheel of the vehicle when a negative drive condition is detected than when no drive condition is detected. Thus, the oversteer condition which is otherwise produced can be appropriately controlled.

Because a slight oversteer condition when the vehicle turns a curve under a negative drive condition is not necessarily undesirable, and may even be desirable in some cases, the control unit may further include a drive torque modifying unit which modifies an output of the drive condition detecting means to a substantially zero value when a negative drive condition is detected. In particular, when the vehicle changes from a positive drive condition to a negative drive condition while tuning a curve, the oversteer condition associated with the negative drive condition occurs with a certain time delay. Therefore, it is desirable not to cancel the preferential torque distribution, which has been controlling the understeer tendency of the vehicle under the positive drive condition, too abruptly because it would cause an apparent understeer condition which could alarm the vehicle operator. Therefore, the control unit may further include a first order delay unit which produces a first order delay in an output of the drive torque modifying unit, and a comparison unit which produces a greater one of outputs of the drive torque modifying unit and the first order delay unit as an output from the drive condition detecting means . To select the time constant for this first order time delay in such as manner as to be appropriate at all times, it is deisrable if the time constant takes a smaller value when a lateral acceleration of the vehicle is larger and/or when the vehicle speed is higher.

BRIEF DESCRIPTION OF THE DRAWINGS

Now the present invention is described in the following with reference the appended drawings, in which.

DETAILED DESCRIPTION OF THE PREFERRED EMBODIMENTS

Figure 1:
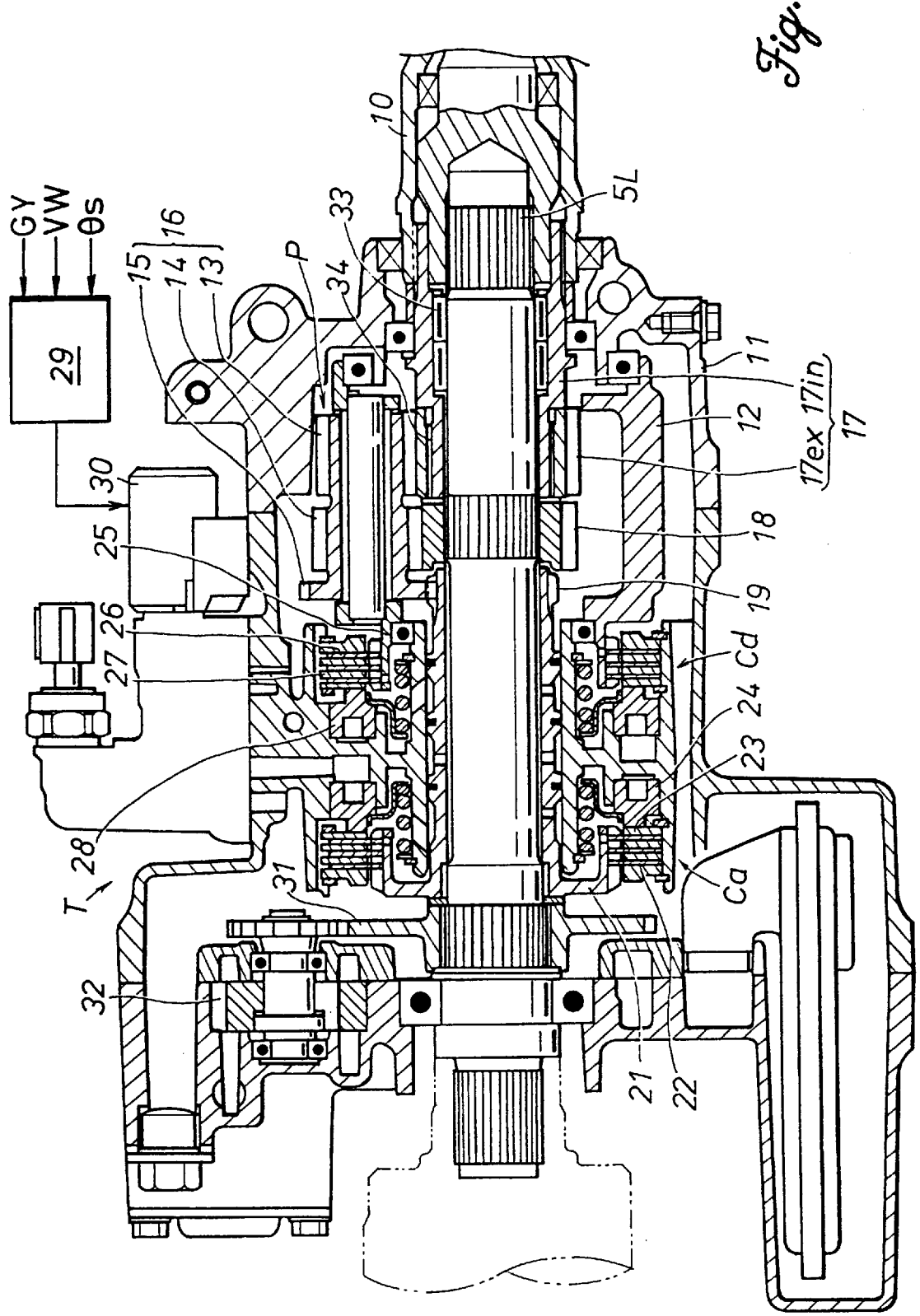
FIG. 1 is a longitudinal sectional view of a torque splitting device for distributing an input torque to right and left axles of a vehicle embodyiny the present invention.
Figure 2:
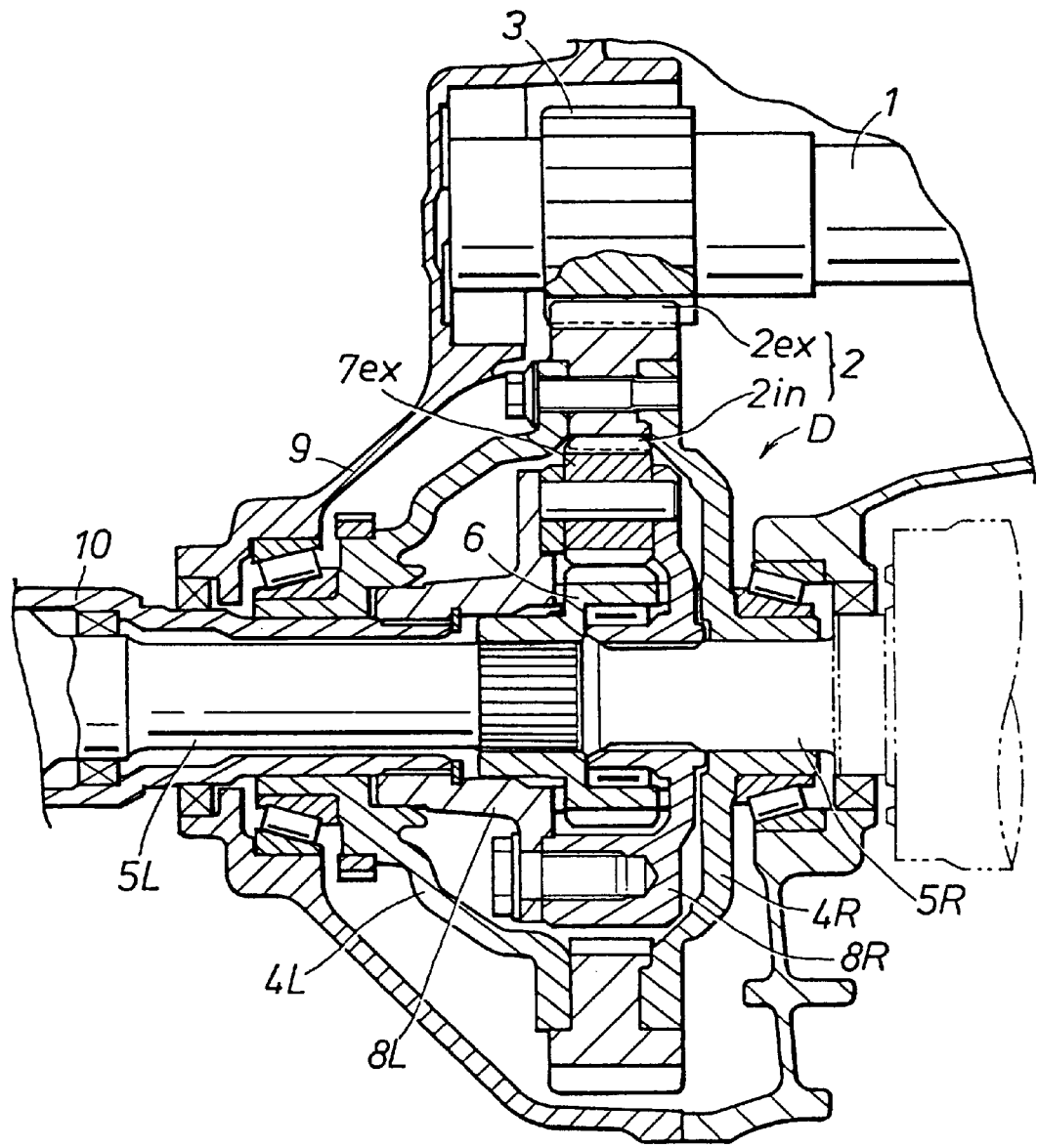
FIG. 2 is a longitudinal sectional view of a differential device which is connected to the torque splitting device of FIG. 1.

First of all, the torque splitting device to which the present invention is applied is described with reference to FIGS. 1 and 2. This torque splitting device T is connected to an output shaft 1 of a transmission to which the engine output is transmitted, via a differential device D which is illustrated in FIG. 2.

The differential device D consists of a double pinion type planetary gear mechanism, and comprises a driven member 2 which includes an external teeth gear 2ex meshing with an output gear 3 provided on an axial end of the output shaft 1 of the transmission, and an internal teeth gear 2in formed integrally with the external teeth gear 2ex, differential casing halves 4L and 4R which are joined together by threaded bolts interposing the driven member 2 between them, right and left output shafts 5L and 5R which are rotatably passed through central holes of the differential casing halves 4L and 4R, respectively, a sun gear 6 which is spline coupled to an axial end of the left output shaft 5L, outer pinions 7ex which each mesh with the internal teeth gear 2in of the driven member 2 and rotate around both itself and the sun gear 6, inner pinions 7in (see FIG. 3; the inner pinions 7in do not appear in FIG. 1) which each mesh with the outer pinions 7ex and the sun gear 6 and rotate around both itself and the sun gear 6, and right and left planetary carriers 8L and 8R which rotatably support the inner and outer pinions 7in and 7ex. Central parts of the right and left differential casings 4L and 4R are supported by a transmission housing 9 for instance by roller bearings. The right planetary carrier 8R pivotally supports the sun gear 6 via a needle bearing, and is spline coupled to an axial end of the right output shaft 5R. The left planetary carrier 8L surrounds the left output shaft 5L, and is spline coupled to the right end of a sleeve 10 passed through the central hole of the left differential casing 4L.

In this differential device D, the driven member 2 serves as an input element, and the sun gear 6 which serves as one of two output elements, is connected to the left front wheel WFL via the left output shaft 5L while the right planetary carrier 8R which serves as the other output element is connected to the right front wheel WFR via the right output shaft 5R. A drive shaft equipped with a known isokinetic coupling is interposed between the left output shaft 5L and the left front wheel WFL, and between the right output shaft 5R and the right front wheel WFR.

The torque splitting device T consists of a planetary gear mechanism P, and clutches Ca and Cd for acceleration and deceleration each consisting of a wet hydraulic multi-plate clutch.

The planetary gear mechanism P of the torque splitting device T comprises a planetary carrier 12 pivotally supported by a casing 11 so as to surround the left output shaft 5L, a plurality (for instance four) of triple pinion members 16 which each integrally combine a first pinion 13, a second pinion 14 and a third pinion 15, and pivotally supported along a circle concentric to the center of the planetary carrier, a first sun gear 17 pivotally supported around the left output shaft 5L and meshes with the first pinion 13, a second sun gear 18 which is spline coupled to the outer circumference of the left output shaft 5L at a point immediately left of the first sun gear 17, and a third sun gear 19 which is integral with an inner plate retaining member 21 of the acceleration clutch Ca and meshes with the third pinion 15. The inner plate retaining member 21 is pivotally supported around the left output shaft 5L.

The first sun gear 17 is spline coupled to the left end of the sleeve 10 which is in turn spline coupled to the left planetary carrier 8L of the differential device D so as to integrally rotate with the planetary carriers 8L and 8R and the right output shaft 5R of the differential device D.

The acceleration clutch Ca couples inner plates 22, which are axially slidably engaged by the inner plate retaining member 21 pivotally mounted on the left output shaft 5L, with outer plates 23, which are axially slidably engaged by an inner surface of the casing 11, with the thrust force of an annular hydraulic piston 24, and performs the function of arresting the rotation of the third sun gear 19 which is integral with the inner plate retaining member 21.

The deceleration clutch Cd couples inner plates 26, which are axially slidably engaged by an inner plate retaining member 25 formed in the planetary carrier 12, with outer plates 27, which are axially slidably engaged by an inner surface of the casing 11, with the thrust force of an annular hydraulic piston 28, and performs the function of arresting the rotation of the triple pinion members 16, which are pivotally supported by the planetary carrier 12, around the sun gears.

The engagement forces of the acceleration and deceleration clutches Ca and Cd are controlled by the oil pressure supplied thereto from a gear pump 32, driven by a spur gear 31 spline coupled to the left output shaft 5L, via an oil pressure circuit including a pressure regulating valve 30. The pressure regulating valve 30 is controlled by an electronic control unit 29 receiving a vehicle speed VW and a steering angle θs as data.

Figure 3:
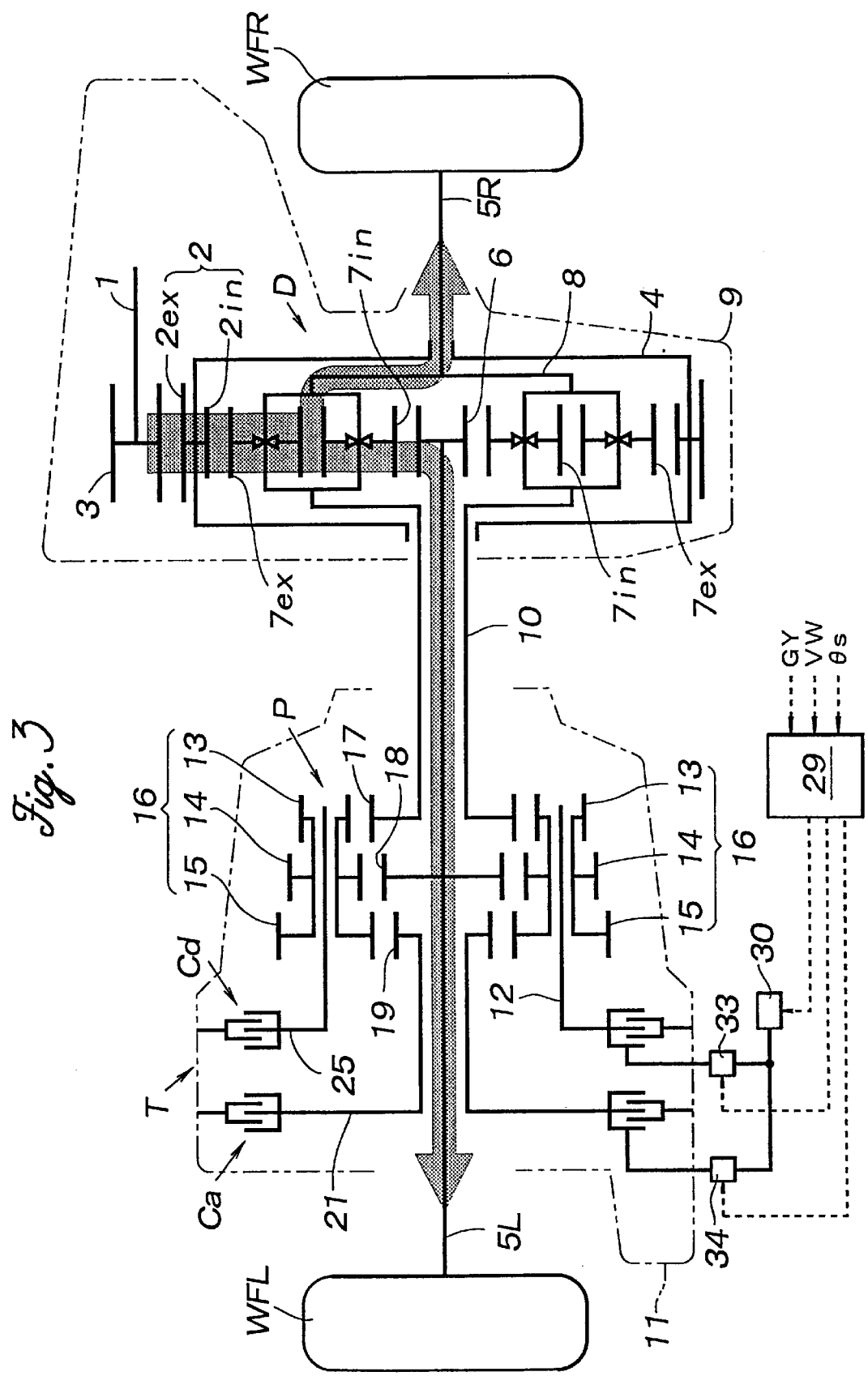
FIG. 3 is a skeleton diagram of a power transmission system of a front engine, front drive vehicle which combines the torque splitting device and the differential device shown in FIGS. 1 and 2, repsectively.

Now the operation of this device is described in the following with reference to FIGS. 3 to 5.

When the vehicle is traveling straight ahead, the deceleration and acceleration clutches Cd and Ca are both disengaged. As a result, the planetary carrier 12 and the third sun gear 19 of the torque splitting device T are both allowed to move freely, and the left output shaft 5L, the right output shaft 5R, the planetary carrier 8 of the differential device D, and the planetary carrier 12 of the torque splitting device T all move in a body. As indicated by the shaded arrow in FIG. 3, the output torque of the engine is evenly distributed to the right and left front wheels WFL and WFR via the differential device D.

Figure 4:
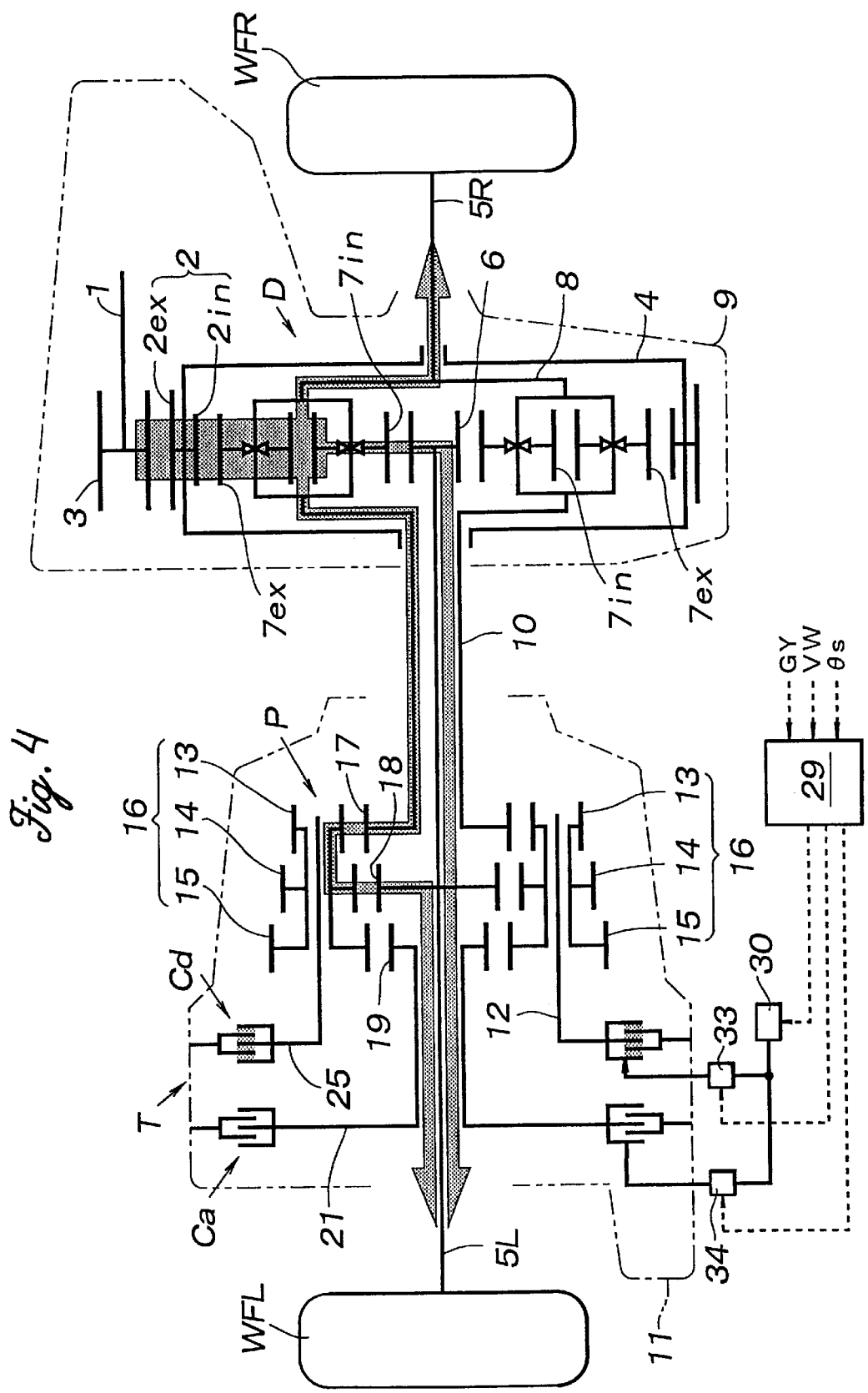
FIG. 4 is a view similar to FIG. 3 illustrating the control action during a right turn.

When the vehicle is turning right, as shown in FIG. 4, the deceleration clutch Cd is engaged so that the planetary carrier 12 is joined with the casing 11, and is thereby kept stationary. Because the left front wheel WFL which is integral with the left output shaft 5L (or the planetary carrier 8L of the differential device D) is coupled with the right front wheel WFR which is integral with the right output shaft 5R (or the planetary carrier 8R of the differential device D) via the meshing between the second sun gear 18 and the second pinion 14, and the meshing between the first pinion 13 and the first sun gear 17, the rotational speed NL of the left front wheel WFL is increased in speed over the rotational speed NR of the right front wheel WFR.

$$NL/NR=(Z4/Z3)(Z1/Z2) \quad \text{(Equation 1)}$$

where Z1: number of teeth of the first sun gear 17

Z2: number of teeth of the first pinion 13

Z3 : number of teeth of the second sun gear 18

Z4: number of teeth of the second pinion 14

As described above, when the rotational speed NL of the left front wheel WFL is increased in speed over the rotational speed NR of the right front wheel WFR, as indicated by the shaded arrow in FIG. 4, a part of the torque distributed to the right front wheel WFR or the inner wheel from the differential device D is transmitted to the left front wheel WFL or the outer wheel.

When the planetary carrier 12 of the torque splitting device T is reduced in speed by partly engaging the deceleration clutch Cd instead of totally preventing the motion of the planetary carrier 12, the rotational speed NL of the left front wheel WFL is increased in speed over the rotational speed NR of the right front wheel WFR by a corresponding amount so that it is possible to change the amount of torque transmission from the right front wheel WFR or the inner wheel to the left front wheel WFL or the outer wheel at will.

Figure 5:
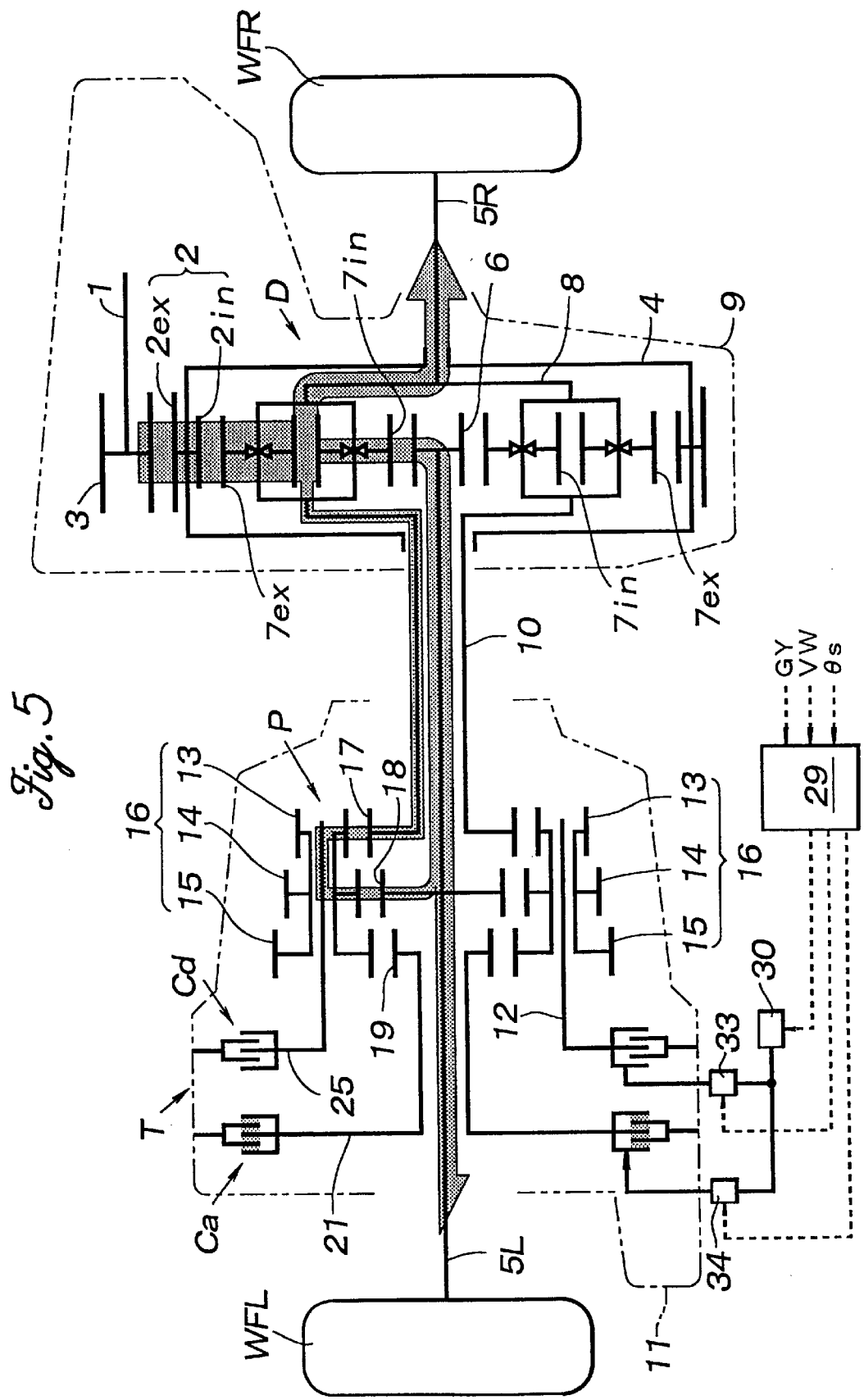
FIG. 5 is a view similar to FIG. 3 illustrating the control action during a left turn.

When the vehicle is turning left, as shown in FIG. 5, the acceleration clutch Ca is engaged so that the third sun gear 19 which is integral with the inner plate retaining member 21 of the acceleration clutch Ca is kept stationary. As a result, the triple pinion members 16 rotate around the center of the sun gears via the third pinion 15 meshing with the third sun gear 19, and the rotational speed of the planetary carrier 12 is increased over the rotational speed NL of the left front wheel WFL according to the following relationship.

$$NL/NR=[1-(Z5/Z6)(Z2/Z1)]/[1-(Z5/Z6)(Z4/Z3)] \quad \text{(Equation 2)}$$

where Z5: number of teeth of the third sun gear 19

Z6: number of teeth of the third pinion 15

As described above, when the rotational speed NR of the right front wheel WFR is increased in speed over the rotational speed NL of the left front wheel WF, as indicated by the shaded arrow in FIG. 5, a part of the torque distributed to the left front wheel WFL or the inner wheel from the differential device D is transmitted to the right front wheel WFR or the outer wheel. In this case also, it is possible to change the amount of torque transmission from the left front wheel WFL to the right front wheel WFR at will by changing the engagement force of the acceleration clutch Ca.

Now the operation of the electronic control unit 29 embodying the present invention is described in the following with reference to FIGS. 6 and 8.

According to the previously proposed arrangement the torque distribution to the right and left front wheels was determined in such a way that the right and left wheels follow the turning circle without involving any significant side slip angle. However, when the vehicle is accelerating (positive drive torque XG) while turning, there will be an understeer tendency. To offset such a tendency, it may be desirable to shift some of the drive torque of the inner front wheel to the outer front wheel. Conversely when the vehicle is decelerating negative drive torque XG) while making a turn, there will be an oversteer tendency. To offset such a tendency, it may be desirable to shift some of the drive torque of the outer front wheel to the inner front wheel. Thus, the vehicle can follow the turning circle as determined by the steering angle of the steering wheel irrespective of the acceleration or deceleration condition of the vehicle.

However, there are those vehicle operators who would not find such a control action entirely satisfactory. FIG. 6 illustrates the internal arrangement of the control unit 29 which takes into account such a factor as described hereinafter. The control unit 29 receives signals which represent a turning amount (KG) and an actual drive torque (XG). The turning amount KG is given by the following formula.

$$KG=YG+f_1(\theta s \times VW) \quad \text{(Equation 3)}$$

where YG lateral acceleration

θs: steering angle

VW: vehicle speed

The actual drive torque XG is modified into a modified drive torque XGF by a drive torque modifying unit 45 as defined by the following formula.

$$XGF=XG \text{ (when } XG>0) \ 0 \text{ (when } XG\leq 0) \quad \text{(Equation 4)}$$

By using the modified drive torque XGF instead of the simple drive torque XG in the control of the right and left torque distribution, it is possible to retain the slight oversteer tendency when the vehicle decelerates while turning. This is beneficial because the vehicle operator is able to handle the vehicle more at will. When the vehicle accelerates while turning, the engine drive torque is shifted from the inner wheel to the outer wheel, and the understeer tendency is thereby offset by a suitable torque distribution.

Figure 7:
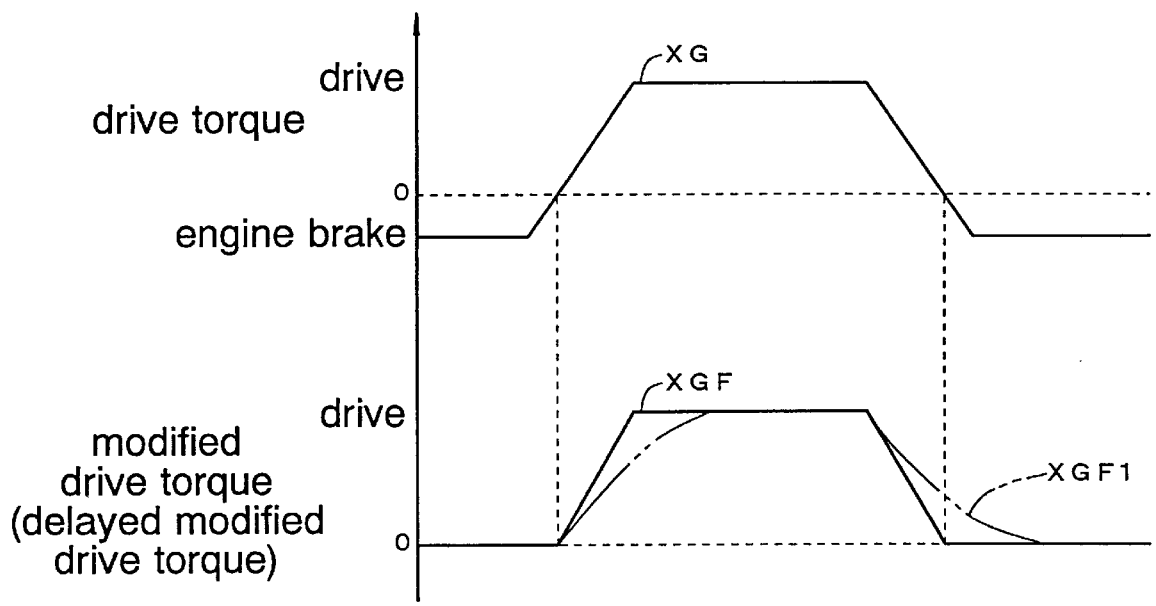
FIGS. 7 and 8 are diagrams for describing the control action of the control arrangement.

The upper part of FIG. 7 shows a typical pattern of the engine drive torque XG when a vehicle turns a curve. Initially, the vehicle enters the curve while decelerating. Once the vehicle enters the curve at a suitable speed, the vehicle gradually increases the speed. As often the case, this acceleration then turns out to be slightly excessive, and toward the end of the curve, the vehicle again decelerates. For driving comfort, it is desirable to produce a suitable amount of oversteer tendency when the vehicle decelerates while turning because the intention to decelerate is normally due to the anticipated difficulty in completing the turn without swerving outward from the turning circle of the vehicle if the current vehicle speed is maintained.

Figure 6:
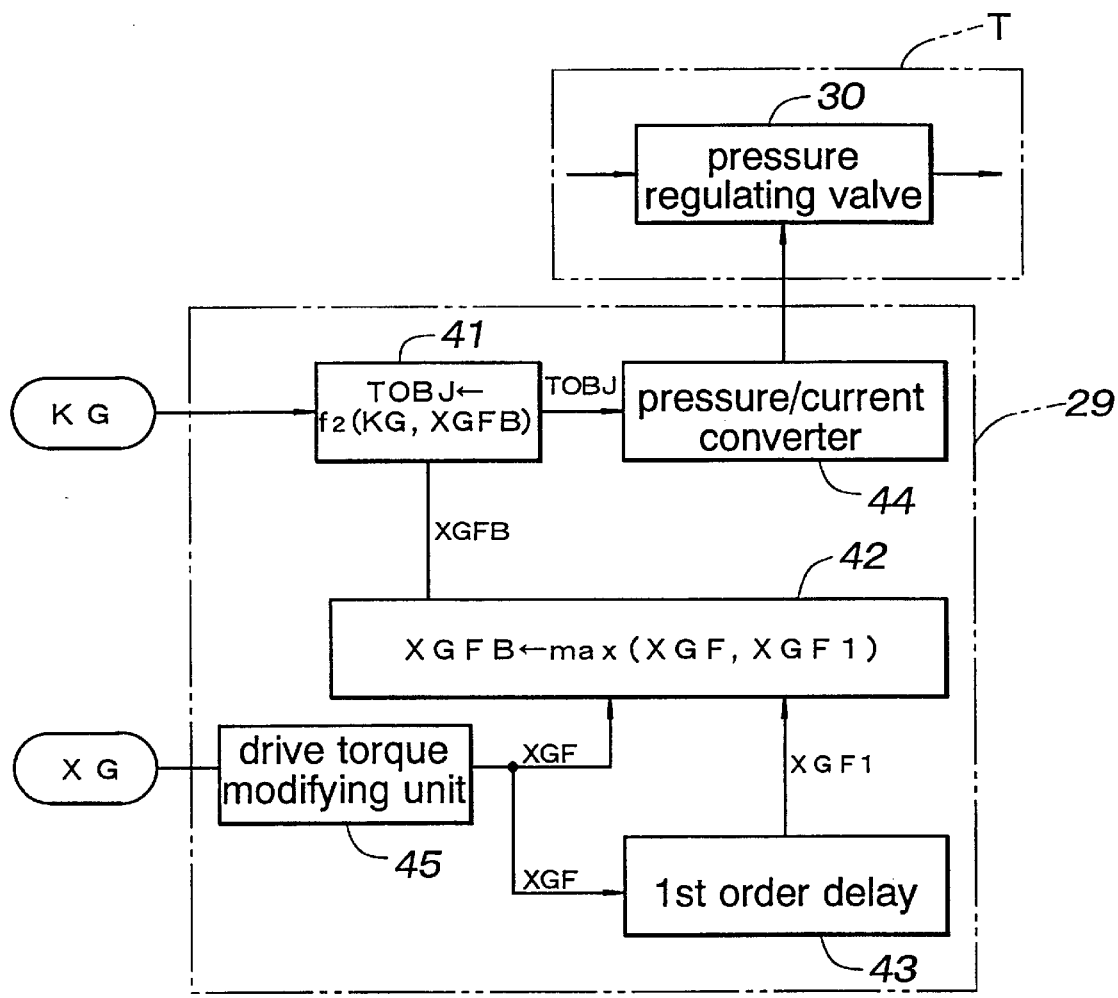
FIG. 6 is a block diagram of the control arrangement of the torque splitting device.

FIG. 6 illustrates the inner arrangement of the control unit 29. The turning amount KG is supplied to torque distribution ratio computing unit 41, and the modified drive torque XGF is supplied to a drive torque comparing unit 42 and a first order delay unit 43. The output of the first order delay unit 43 is supplied to the drive torque comparing unit 42. The drive torque comparing unit 42 compares the modified drive torque XGF directly supplied thereto with a delayed acceleration drive torque XGF1 supplied thereto via the first order delay unit 43, and forwards the larger of the values of these two signals to the torque distribution ratio computing unit 41 which is connected to an oil pressure/current converter 44 for actually controlling the pressure regulating valve 30 as required.

The comparing process in the drive torque comparing unit 42 is now described in the following with reference to FIG. 7. Suppose that the engine drive torque changes as indicated by the upper part of FIG. 7 during a turn. As indicated in the lower part of FIG. 7, the modified drive torque XGF is zero when the actual drive torque XG is zero or less, and is otherwise equal to the actual drive torque XG. The output XGF1 of the first order delay unit 43 changes as indicated by the double chain dot line in the lower part of FIG. 7. The drive torque comparing unit 42 compares the modified drive torque XGF and the delayed modified drive torque XGF1, and produces the larger of these two values as an effective drive torque XGFB.

The torque distribution ratio computing unit 41 computes a torque distribution ratio TOBJ with a mathematical function of $f_2$ (KG, XGFB) of the turning amount KG directly supplied thereto, and the effective drive torque XGFB supplied from the drive torque comparing unit 42. The obtained torque distribution ratio TOBJ is converted into an oil pressure target value by the oil pressure/current converter 44 for determining the state of the pressure regulating valve 30.

Thus, according to this control arrangement, the torque splitting device is controlled as described in the following. When the vehicle decelerates while turning, the torque splitting device operates as if the vehicle were turning at a constant speed, disregarding the deceleration of the vehicle. When the vehicle accelerates while making a turn, the drive torque is somewhat shifted from the inner wheel to the outer wheel to offset the understeer tendency which may be otherwise produced. When the vehicle starts accelerating either from a deceleration condition or a constant speed condition, it is desirable to shift the drive torque from the inner wheel to the outer wheel as quickly as possible.

Therefore, the torque comparing unit 42 forwards the modified drive torque XGF as the effective XGFB to the mathematical function $f_2$ (KG, XGFB). However, when the vehicle starts decelerating from an acceleration condition, it is not desirable to cancel the shifting of the drive torque from the outer wheel to the inner wheel too quickly. This is because if the torque distribution which has been assisting the turning tendency of the vehicle is abruptly removed, this creates a phase of apparent understeer condition because the oversteer condition associated with the deceleration of the vehicle while turning occurs with a certain time delay. Therefore, according to this embodiment, the torque comparing unit 42 forwards the delayed modified drive torque XGF1 as the effective drive torque XGFB to the mathematical function $f_2$ (KG, XGFB).

Suppose a situation where the vehicle enters a curve while decelerating, and turns the curve while accelerating as recommended by any experienced vehicle operator. While turning, the vehicle operator may realize that the vehicle speed may be excessive to safely complete the turning of the curve, and decelerates. According to the control unit 29 of this embodiment, the vehicle entering the curve is given a slight oversteer tendency, and maintains a neutral steer tendency during acceleration. When the vehicle decelerates in the midst of making the turn, it is essential not to create any understeer tendency even if it is a transient occurrence in view of avoiding the swerving of the vehicle outward from the intended turning circle of the vehicle. The control unit therefore employs the first order delay to avoid any abrupt canceling of the shifting of the drive torque from the inner wheel to the outer wheel upon the change from the accelerating phase to the decelerating phase.

When carrying out the above described control action, the engagement forces of the engagement clutches may be continually controlled between a zero engagement state and a full engagement state. This can be accomplished either by analog control of the oil pressure or by pulse width control or other digital control of the oil pressure.

Figure 8:
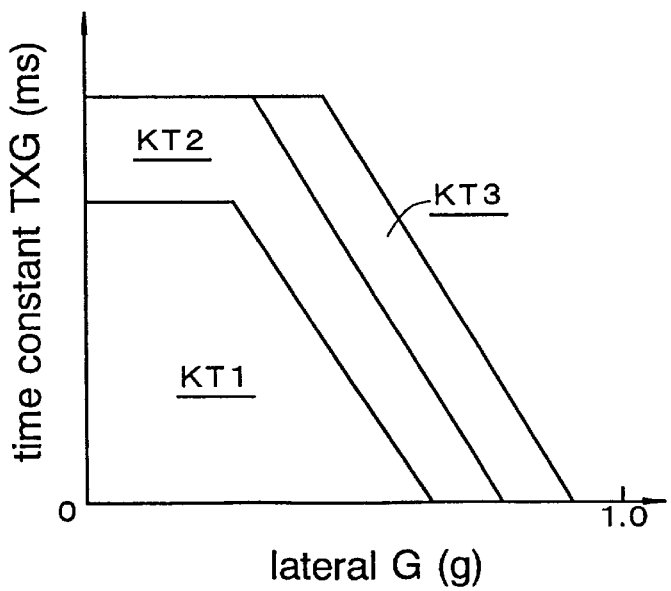
Figure 9:
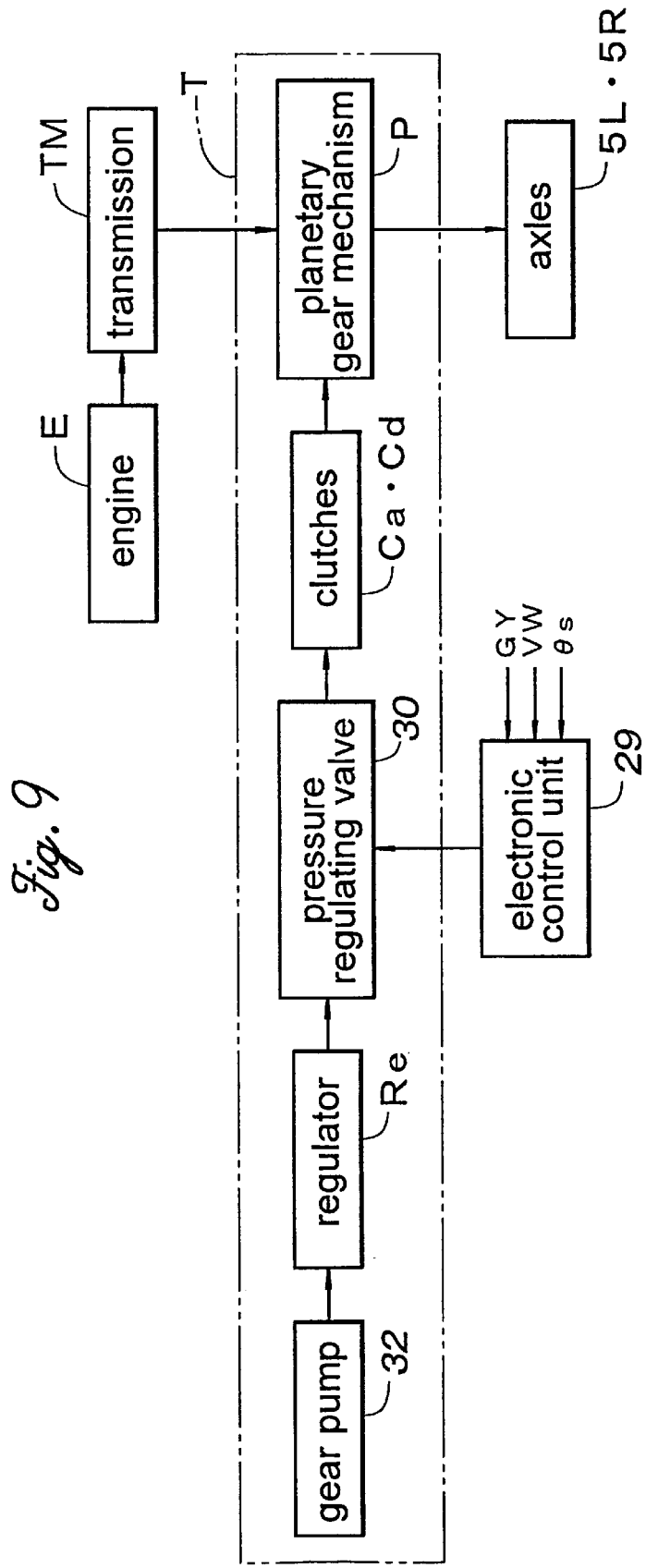
FIG. 9 is a block diagram showing the overall structure of a previous proposed torque splitting device to which the present invention is applied.

The time constant TXG used by the first order delay unit 43 may be determined from a data map which relates the time constant with the lateral acceleration GY of the vehicle, for instance as indicated in FIG. 8. This data map is defined by three different curves KT1, KT2 and KT3 depending on the vehicle speed. The curves KT1, KT2 and KI3 represent high, medium and low speed ranges, respectively. As shown by the diagram of FIG. 8, as the vehicle speed increases, the time constant becomes generally smaller or the canceling of the shifting of the drive torque becomes generally quicker. This is desirable because as the vehicle speed increases, the onset of the oversteer condition following the deceleration while making a turn is relatively more immediate. Also, as the lateral acceleration GY increases, the time constant becomes generally smaller. This is desirable because a large lateral acceleration means an accordingly extreme drive condition, and the vehicle operator needs and may well expect a quick recovery of an oversteer tendency all the more.

Although the present invention has been described in terms of preferred embodiments thereof, it is obvious to a person skilled in the art that various alterations and modifications are possible without departing from the scope of the present invention which is set forth in the appended claims.

What we claim is:

1. A torque splitting device for distributing an input torque applied to an input member to a pair of output members adapted to be coupled with right and left driven wheels of a vehicle at an adjustable distribution ratio, comprising:

a torque splitting mechanism including at least one hydraulically actuated clutch coupled to at least one planetary gear mechanism so as to control a torque distribution ratio to the two output members;

an oil circuit for supplying actuating oil to said clutch including a regulating valve for controlling a pressure of the actuating oil supplied to said clutch;

means for detecting a drive condition of said vehicle; and a control unit for controlling said torque distribution ratio via said regulating valve according to a prescribed control schedule;

said control unit being adapted to change said torque distribution ratio according to an output signal from said drive condition detecting means when said vehicle is turning in such a manner that said input torque is more preferentially distributed to one of the output members coupled with an outer wheel of the vehicle over the other output member coupled with an inner wheel of the vehicle when a positive drive condition is detected than when no positive drive condition is detected and, when the vehicle starts decelerating from an accelerated condition, preferential distribution of the input torque to the output member coupled with the outer wheel is canceled only after a certain time delay.

2. A torque splitting device according to claim 1, wherein said control unit further includes a drive torque modifies unit which modifies an output signal of said drive condition detecting means to a substantially zero value when a negative drive condition is detected.

3. A torque splitting device according to claim 2, wherein said control unit further includes a first order delay unit which produces a first order delay in an output signal of said drive torque modifying unit, and a comparison unit which produces a greater one signal of output signals of said drive torque modifying unit and said first order delay unit.

4. A torque splitting device according to claim 3, wherein a time constant of said first order delay unit decreases as lateral acceleration of the vehicle increases and/or when the vehicle speed increases.

5. A torque splitting device according to claim 1, wherein said torque distribution ratio is achieved by changing a speed transmission ratio from said input member to at least one of said output members.

6. A torque splitting device for distributing an input torque applied to an input member to a pair of output members adapted to be coupled with right and left front driven wheels of a vehicle at an adjustable distribution ratio, comprising:

a torque splitting mechanism including at least one hydraulically actuated clutch for controlling a torque distribution ratio to the two output members;

an oil circuit for supplying actuating oil to said clutch including a regulating valve for controlling a pressure of the actuating oil supplied to said clutch;

means for detecting a drive condition of said vehicle; and a control unit for controlling said torque distribution ratio via said regulating valve according to a prescribed control schedule;

wherein said control unit is adapted to distribute torque preferentially to the output member coupled with an inner wheel of the vehicle over the output member coupled with an outer wheel of the vehicle when a negative drive condition is detected versus when a positive drive condition is detected.

7. A torque splitting device according to claim 6 wherein said control unit her includes:

a second control unit adapted to receive a drive torque signal and to produce a first output signal;

a first order delay unit coupled to said second control unit and adapted to produce a second output signal as a first order delay in said first output signal; and a comparison unit coupled to said second control unit and to said first order delay unit;

wherein said comparison unit is adapted to provide the greater of either said first or said second output signals as a third output signal of said control unit for controlling said torque distribution ratio.

8. A torque splitting device according to claim 7 wherein a time constant of said first order delay unit decreases as either said vehicle's lateral acceleration or said vehicle's speed increases.

9. A motor vehicle torque distribution device comprising:

a torque splitting mechanism including a hydraulically actuated clutch, wherein the mechanism receives input torque via an input member and supplies output torque to a left driven wheel via a first output member and output torque to a right driven wheel via a second output member;

an oil circuit supplying actuating oil to the clutch, the oil circuit including a valve regulating pressure of the actuating oil;

a drive condition detector, wherein the detector senses at least vehicle drive torque; and a controller coupled to the detector and the valve, wherein the controller is adapted to receive a signal from the detector and to activate the valve such that as the vehicle performs a turn, when an acceleration occurs in the vehicle speed the controller distributes greater torque to the output member for the wheel on the outside of the turn than to the output member for the wheel on the inside of the turn, and when a deceleration in vehicle speed occurs after the acceleration the controller stops, after a predetermined time delay, distributing the greater torque to the output member for the wheel on the outside of the turn.

10. The device of claim 9 wherein the controller distributes torque essentially equally between the first and second output members after the time delay occurs.

11. The device of claim 9 wherein the time delay decreases as lateral acceleration of the vehicle increases.

12. The device of claim 9 wherein the time delay decreases as vehicle speed increases.

* * * * *